United States Patent [19]

McLean

[11] 4,289,294
[45] Sep. 15, 1981

[54] WELLHEAD FLOW CONTROL DEVICES

[75] Inventor: Douglas K. McLean, Dallas, Tex.

[73] Assignee: Double-E, Inc., Dallas, Tex.

[21] Appl. No.: 111,604

[22] Filed: Jan. 14, 1980

[51] Int. Cl.$^3$ .................... F16K 31/143; F16K 41/02
[52] U.S. Cl. ........................................ 251/62; 138/89; 138/94; 166/84; 166/97; 251/14; 251/214; 277/102
[58] Field of Search ............... 137/315, 317, 318, 319, 137/320, 321, 322; 138/89, 94; 166/31; 251/58, 62, 63, 14, 214; 277/102

[56] References Cited

U.S. PATENT DOCUMENTS

| | | | |
|---|---|---|---|
| 1,881,269 | 10/1932 | Evans et al. | 251/214 |
| 1,929,867 | 10/1933 | Hall, Jr. | 251/14 |
| 2,079,922 | 5/1937 | Owen | 166/84 |
| 2,165,228 | 7/1939 | Cornell, Jr. | 138/94 |
| 2,310,351 | 2/1943 | Bowan et al. | 138/89 |
| 2,569,023 | 9/1951 | Sanford | 251/214 |
| 2,673,615 | 3/1954 | Humason | 166/84 |
| 2,763,282 | 9/1956 | Reedy et al. | 137/318 |
| 2,780,233 | 2/1957 | Volpin | 137/315 |
| 2,899,983 | 8/1959 | Farris | 137/318 |
| 3,215,208 | 11/1965 | Tamplen | 277/102 |
| 3,334,907 | 8/1967 | Johnson | 277/102 |
| 3,761,055 | 9/1973 | Ebuchi et al. | 251/214 |
| 3,831,900 | 8/1974 | Matousek et al. | 251/214 |
| 4,127,141 | 11/1978 | Ledonne et al. | 137/318 |
| 4,239,055 | 12/1980 | Coffman | 138/89 |

*Primary Examiner*—Martin P. Schwadron
*Assistant Examiner*—G. L. Walton

*Attorney, Agent, or Firm*—Peter J. Murphy; H. Mathews Garland

[57] ABSTRACT

The device includes a main flow control valve and associated packings designed for effective operation under extreme conditions associated with the pumping of high viscosity asphaltic crude wherein the formation includes toxic gases, and where the formation is produced using steam flooding techniques. The main valve seat and the associated valve closure, consisting of a reciprocating ram and packing plug, are coaxial with the pump polished rod. The valve seat includes tapered walls defining a shoulder which partially confronts the ram plug; and the ram plug is formed of a compressible material formed to the shape of the valve seat. The packing plug is retained on the end of the ram by axial tie rods and a retaining ring, which ring may engage the valve seat shoulder to effect axial compression of the packing plug between the retaining ring and ram face, and consequent radial expansion into sealing engagement. The ram is reciprocated axially, either manually or hydraulically relative to the ram body; and a packing gland, suitable to seal against toxic gases, is provided between the ram and valve body. A rod packing, at the upper end of the ram, includes a primary adjustable packing gland for effective sealing between the ram and the reciprocating polished rod; and may also include a positive shutdown gland for positive sealing at the polished rod in the event of the failure of the primary gland. The positive shutdown is designed for hydraulic operation, to enable automatic operation in response to detection of a gas leak at the primary gland.

41 Claims, 12 Drawing Figures

WELLHEAD FLOW CONTROL DEVICES

BACKGROUND AND SUMMARY OF THE INVENTIONS

These inventions relate to a device for controlling the flow of liquid and gas at a wellhead; and more particularly to such devices for controlling the flow of a mixture of a very high temperature liquid and highly toxic gases, and which devices are operative under climatic conditions ranging from sub-zero winters to hot summers.

The flow control devices of these inventions are designed for use under particularly severe conditions encountered, for example, where the device is used for oil production from a formation of asphaltic crude which includes highly toxic gases such as hydrogen sulphide. Hydrogen sulphide is lethal when released to the atmosphere even in small quantities. The safety codes concerned with the production of crude under these highly toxic conditions are stringent; and this invention is concerned with the problem of meeting the requirements of such codes. Another problem encountered in the production of asphaltic crude, is that steam flooding production techniques may be used, wherein the superheated steam injected into the oil producing zone produces very high operating temperatures. The temperatures may be so high as to preclude the use, as packing materials, of known elastomeric materials such as fluoro-elastomers and fluoro-silicones. The flow control devices operative under these conditions must be effective to control the production flow and also prevent the release of toxic gases at these high operating temperatures. The steam flooding techniques produce very high operating pressures at the wellhead, when the flow control valve is closed, and the control devices must be capable of sealing the wellhead against such pressures.

One object of this invention is to provide a wellhead control device for controlling the flow of crude oil containing highly toxic gases such as hydrogen sulphide, and to prevent the release of such gases to the atmosphere.

Another object of this invention is to provide a wellhead control device for controlling the flow of asphaltic crude oil having hydrogen sulphide in the formation producing zone.

A further object of this invention is to provide a wellhead control device for controlling the flow of crude oil from a formation which has been steam flooded.

Still another object of this invention is to provide a wellhead flow control device for association with the polished rod of a well pump sucker rod string, the device having effective packings preventing the escape of toxic gas to the atmosphere, and which packings may be maintained and replaced with the polished rod in place.

A further object of this invention is to provide such wellhead flow control device for association with the polished rod of a well pump and having effective packings for preventing escape of toxic gas, including a leak safety shutdown for the polished rod packing.

A still further object of this invention is to provide a wellhead valve for shutting off the flow of very high viscosity crude oil, and for reopening such valve against the resistance of such very high viscosity crude oil.

Another object of this invention is to provide a wellhead flow control device for the controlling of crude oil containing toxic gas, and which device would meet the safety codes governing the operation of such devices.

These objects are accomplished in a wellhead control device including a valve and associated packing glands, configured for coaxial association with the polished rod on the well pump. The valve comprises a body providing an annular closure seat and a coacting closure ram guided for reciprocating movement relative to the closure seat. The closure ram comprises an elongated body having an axial bore dimensioned for free passage of the rod string, a compressible annular packing mounted at the closure end of the ram body, and annular retaining means for axially retaining the packing to the ram body. The closure seat comprises an annular shoulder confronting the retaining means of the ram, and a generally cylindrical wall extending from the seat shoulder toward the ram. An operator means effects reciprocation of the closure ram relative to the valve body.

More particularly the control device includes a ram packing gland, operative between the valve body and the closure ram, and a polished rod packing gland, operative between the closure ram and the pump polished rod, both effective to prevent the escape of toxic gas from the wellhead.

Still more particularly, the control device includes a polished rod packing assembly provided with a positive shutdown, to seal the polished rod in the event of leakage at the polished rod gland.

The novel features and the advantages of the invention, as well as additional objects thereof, will be understood more fully from the following description when read in connection with the accompanying drawings.

DESCRIPTION OF THE PREFERRED EMBODIMENTS

Figure 1:
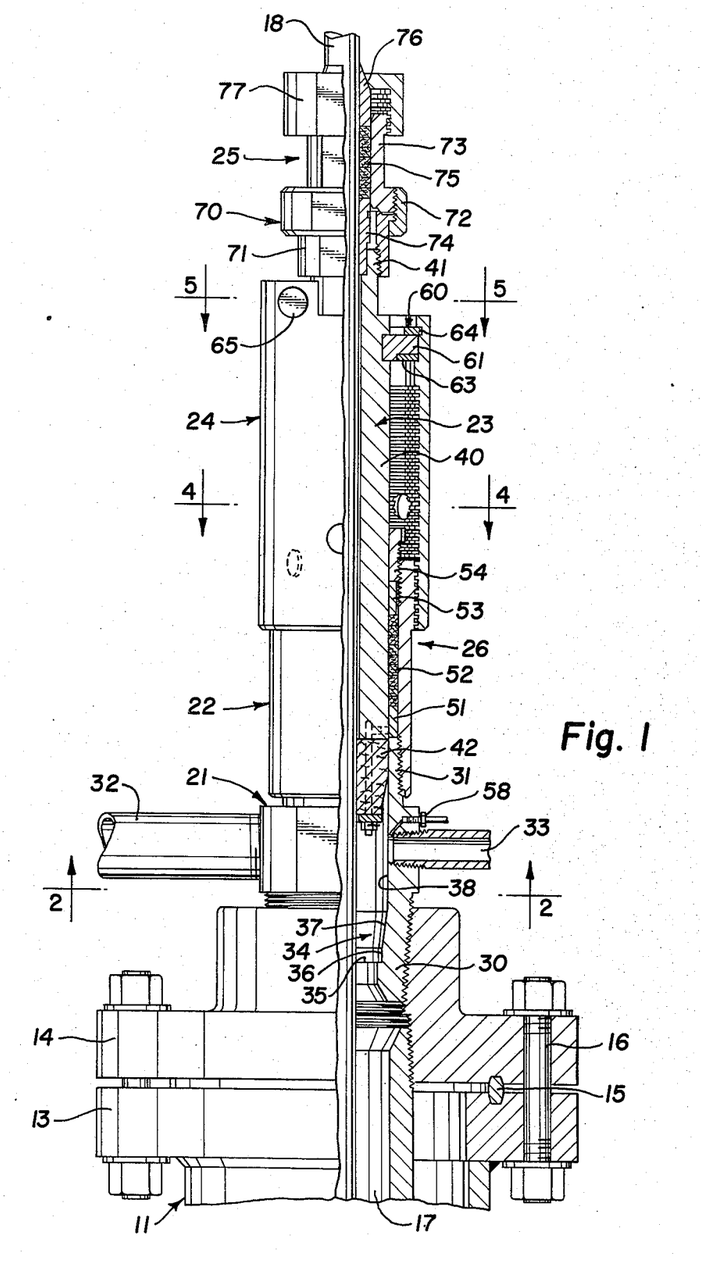
FIG. 1 is a view of a complete flow control device, partially in elevation and partially in axial section.
Figure 2:
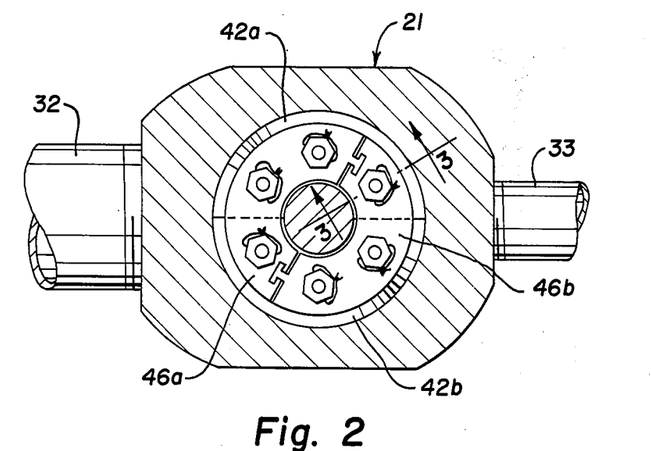
FIG. 2 is a transverse sectional view taken along the line 2—2 of FIG. 1.
Figure 3:
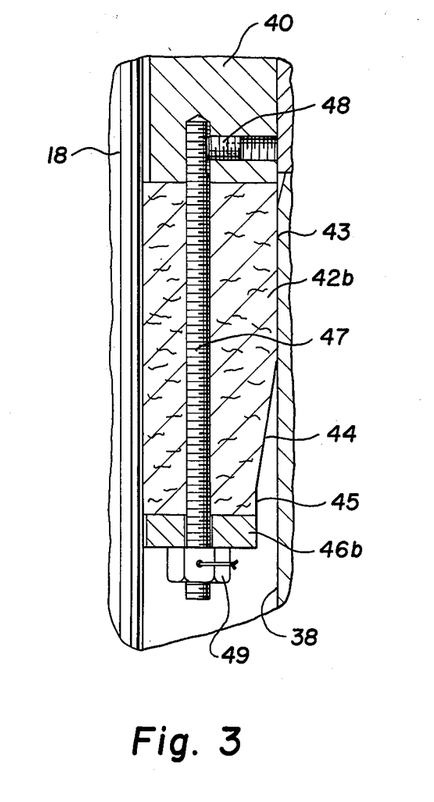
FIG. 3 is a fragmentary sectional view taken along the line 3—3 of FIG. 2.
Figure 4:
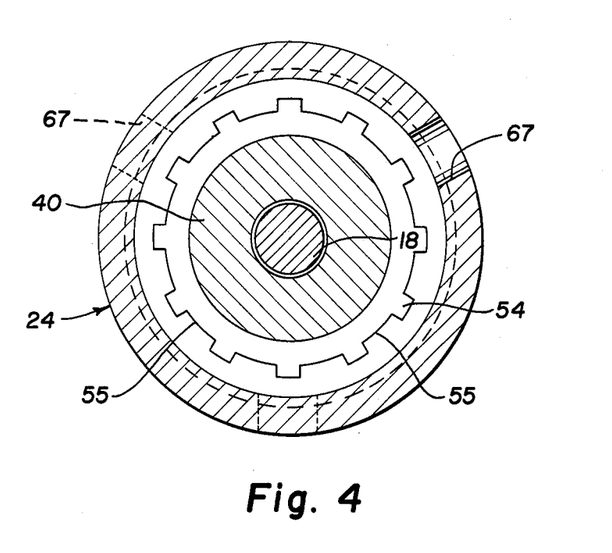
FIG. 4 is a transverse sectional view taken along the line 4—4 of FIG. 1.
Figure 5:
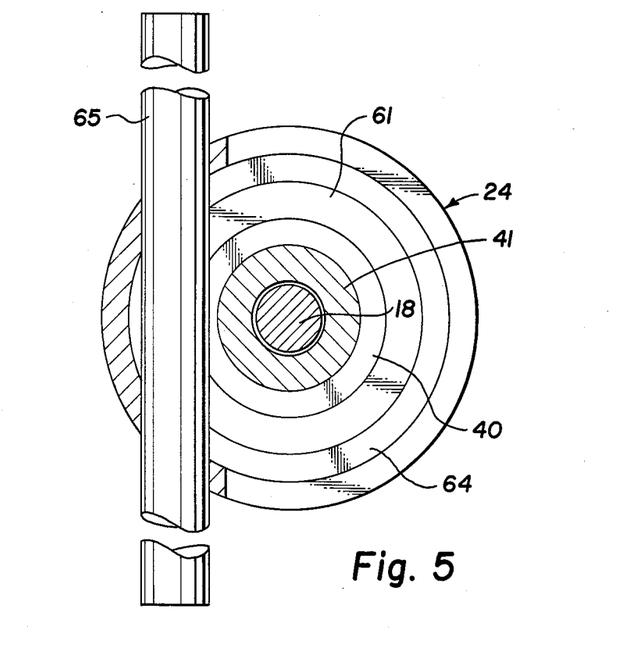
FIG. 5 is a transverse sectional view taken along the line 5—5 of FIG. 1.

One form of wellhead flow control device according to the invention is an assembly mounted on a wellhead 11 by a coupling assembly 12 which consists of a lower flange 13, an upper flange 14 and a coacting ring seal 15. The wellhead 11 may consist, for example, of a casing, a production casing bowl, well tubing, or other member, and the lower flange is attached thereto by means of welding, for example. The flanges clamp the ring seal by means of peripherally spaced nut-bolt assemblies 16. The upper flange is threaded internally for suspending a string of well tubing 17. The flow control device is designed for use with the polished rod 18 of a well pump.

The principal components of the flow control device are a valve body consisting of a lower valve body 21 and an upper valve body 22, a vertically reciprocible closure assembly in the form of a ram 23, an operator sleeve 24 for coupling and reciprocating the closure ram relative to the valve body, and a polished rod packing gland 25 at the upper end of the ram for providing a gas tight seal between the ram 23 and the polished rod 18. The valve body, particularly the upper valve body 22, includes a ram packing gland 26 for providing a gas tight seal between the ram and the valve body. The lower valve body defines a valve seat for the packing plug assembly associated with the closure ram.

The lower valve body 21 includes a lower externally threaded nipple 30 for engagement with the upper flange 14 of the coupling assembly, and an upper externally threaded nipple 31 for threaded engagement with the upper valve body, the nipples being axially aligned and the body providing an axial chamber for receiving the ram 23 and also for the passage of the polished rod. This lower valve body is provided with transverse internally threaded ports for the attachment of pipes defining a flow line 32 and a sampling line 33. The body chamber defines an upward facing annular valve seat 34 which, in the form illustrated in FIG. 1, is defined by a transverse shoulder 35, an axially shallow cylindrical wall 36 contiguous to the transverse shoulder, a tapered conoid shoulder 37 diverging upwardly and outwardly from the cylindrical wall 36, and the lower portion of a contiguous cylindrical wall 38 which extends upwardly through the upper nipple 31. The pipes for the flow line and sampling line open to the upper cylindrical wall 38 above the valve seat 34. The conoid wall diverges at an angle of non-seizing slope.

The closure ram 23 consists of a generally cylindrical body 40, having an axial bore dimensioned for free sliding reciprocation of the polished rod 18. The body has an upper, externally threaded nipple 41 for attachment of an upper interior packing gland to be described subsequently. The body has a principal outer diameter dimensioned for a free sliding fit with the cylindrical chamber portion of the lower valve body which is defined by the cylindrical wall 38. A packing plug 42 consists of an annular body of a compressible packing material which has the capability to retain a preformed shape. The packing plug is secured to the lower end of the ram body, and has an internal diameter corresponding to the diameter of the polished rod 18 and has as its largest outer diameter, a diameter corresponding to the diameter of the chamber wall 38. In one preferred form, the packing plug 42 has a shape corresponding to the shape of the valve seat 34: namely an upper or proximal cylindrical portion 43 having a diameter corresponding to the wall 38, an intermediate conoid portion 44 having a frusto-conical wall corresponding to the frusto-conical conoid shoulder 37, and having a distal cylindrical portion 45 corresponding in diameter and depth to the shallow cylindrical wall portion 36 of the valve seat.

Figure 6:
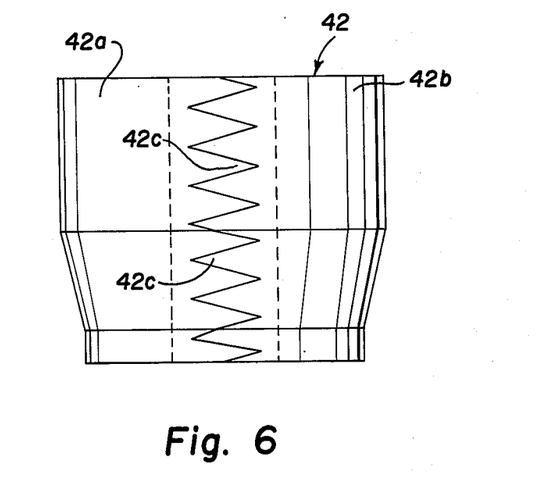
FIG. 6 is a detail view of the ram packing plug.

To enable assembly of the valve plug around the polished rod, the plug consists of an axially split body consisting of identical halves 42a and 42b. As best seen in FIG. 6, the confronting faces of the plug halves are provided with interleaving fingers; and a preferred form as illustrated may consist of sawtooth fingers 42c having an included angle of about 30 degrees. The interleaving fingers may have other forms such as squared or rectangular interleaving fingers. In the assembled relation of the two plug halves, as illustrated in FIG. 6, these interleaving fingers provide an axial seal along the two joints of the plug halves. The packing plug is retained on the ram body by an axially split annular retaining ring consisting of halves 46a and 46b; each half of the retaining ring being retained to the body by three tie rods 47. The tie rods 47 consist of all-thread rods which are threaded into suitable threaded recesses in the ram body, and which extend through bores in the plug which are parallel to the ram axis. Each rod is retained against rotation in its respective recess by a set screw 48 engaging a flatted face on the rod. Each retaining ring half has three holes dimensioned for free sliding relation with its respective tie rods. The packing plug is suitably compressed on the ram by the retaining ring and nuts 49 which are then locked to the respective tie rods by suitable wire locks.

The material for the packing plug may be any material which is suitable for use under the conditions extant at the installed site, with respect to maintaining its sealing capacity at the extant operating temperatures and pressures, and with respect to maintaining the shape and effectiveness of the packing plug through many opening and closing cycles of the valve. The packing plug may be compressible and resilient, to effect the desired lateral sealing against the confining walls when subjected to axial compression. Materials particularly suitable for use in the fabrication of this packing plug may include metallic wool, metallic felt, and metallic tape, and/or ceramic fibers, which will act as a bulk sealing material and which is chemically inert with respect to hydrogen sulfide or other corrosive gases. For the preforming of the packing plug into desired shapes such as have been described, it may be desirable to lace the preformed plug with a suitable wire. The above mentioned materials have the capability, however, of retaining a preformed shape to some extent. Where the operating temperatures are not so severe, other suitable packing materials may be used, such as a fibrous asbestos packing material.

The above described valve seat and mating closure packing plug may have different coacting configurations which will now be described. In the above described configuration, illustrated in FIG. 1, the parts are dimensioned that the annular retaining ring 46a and 46b of the plug assembly will engage the seat transverse shoulder 35 of the valve seat, when the valve is closed, to effect compression of the plug body 42 between the retaining ring and the ram body 40 and consequent radial expansion to promote sealing with the polished rod and the generally coaxial walls of the valve seat.

Effective sealing between the packing plug and valve seat may be effected without this engagement of the retaining ring 46 and a confronting shoulder. In an alternative configuration of the valve seat, the transverse shoulder 35 may be eliminated; and with such arrangement, the tapered conoid shoulder 37 will effect both radial and axial compression of the packing plug 42 to effect the desired sealing between the polished rod and the valve seat.

Figure 6A:
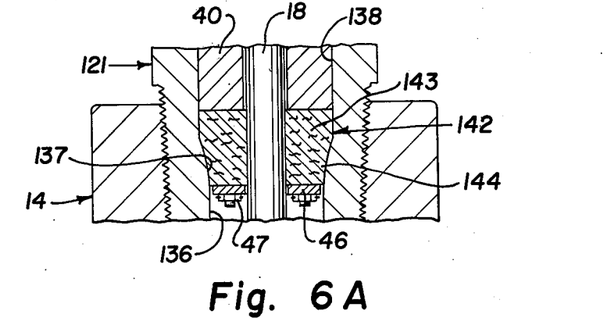
FIGS. 6A and 6B are fragmentary views of alternative valve seats and valve closure packings.

FIG. 6A of the drawing illustrates a somewhat similar alternative form wherein the valve seat is defined by a tapered convex shoulder 137 which merges with the adjacent lower cylindrical wall 136 of the chamber, and with its upper periphery meeting the upper cylindrical wall 138 of the chamber of the lower valve body 121. The packing plug 142 has a corresponding shape including an upper cylindrical portion 143, having a diameter corresponding to that of the wall 138, and a lower tapered concave portion 144 configured to mate with the convex shoulder 137. This plug is retained by the same retaining ring assembly 46, 47 previously described.

Figure 6B:
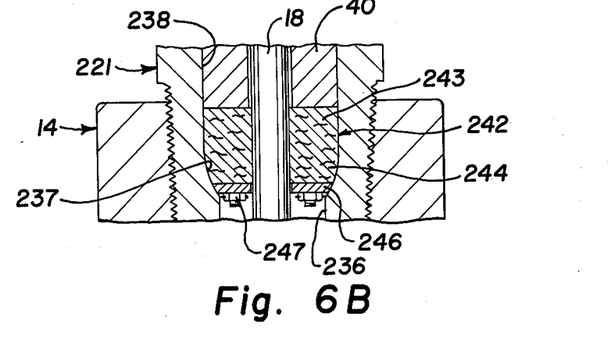

FIG. 6B illustrates another alternative form of valve seat and packing plug configuration wherein the valve seat is defined by a tapered concave shoulder 237 which merges with the upper cylindrical wall 238 of the chamber of the lower valve body 221, and joins the lower cylindrical chamber wall 236 of smaller diameter. The packing plug 242 has an upper cylindrical portion of a diameter corresponding to that of the wall 238, and a lowered tapered convex portion 244 for coaction with the concave shoulder 237. The retaining assembly for retaining the packing plug to the ram body 40 is similar to that previously described, including an annular retaining ring 246 secured by rods 247 and associated nuts. In this configuration the peripheral surface of the retaining ring 246 is tapered to mate with the lower portion of the tapered concave shoulder 237. In this configuration, then, the lower portion of the concave shoulder 237 axially confronts the retaining ring 246 to effect axial compression of the packing plug 242 when the valve is closed.

For all of the above described packing plug configurations, the packing plug may be retained to the ram body 40 by other types of rods and assemblies such as threaded studs which are threaded only at one end for reception into the threaded bores of the ram body 40, with the retaining rings being retained by suitable washers and cotter pins or other type locking pins.

While the above described coacting valve seat and valve closure configurations are in association with the polished rod of a sucker rod string, it will be apparent that these structures will function in a similarly effective manner with the polished rod absent and with the packing plug being solid rather than annular.

The upper valve body 22 is a generally cylindrical sleeve having internal threads at its lower end for joining it to the lower valve body 21, and having internal and external threads at its upper end. The principal internal diameter of the sleeve 22 is larger than that of the cylindrical wall 38 and of the ram body 40 to accommodate the ram packing gland 26 operative between the valve body and the ram body. This ram packing gland 26 consists of a lower packing ring 51, seated on the upper end of the lower valve body nipple 31, an annular packing material 52, an upper packing ring 53, and an externally threaded packing nut 54 threaded into the upper end of the sleeve 22. The exposed upper end of the packing nut is provided, at its outer periphery, with a plurality of peripherally spaced indentions 55 to enable the rotation of the packing nut without disassembly of the flow control device, in a manner to be described subsequently. The packing rings are split into complementary halves along an axial plane, for ease of assembly and disassembly as will be described.

The packing material 52 for this packing gland may be any material suitable for the particular operating conditions at the gland. It may be the same metallic materials described above, which materials may be available in strands having the illustrated square cross section, and may be inserted into the gland in a spiral configuration to be suitably compressed between the respective packing rings.

The operator sleeve 24 is a generally cylindrical member having internal square threads throughout most of its length for coaction with the external square threads on the upper end of the upper valve body 22. The operator sleeve is coupled to the ram body by means of a thrust coupling 60 adjacent to the upper ends of both members. The thrust coupling consists of an annular thrust collar 61 disposed in an annular groove in the ram body, and seating on an upward facing shoulder 62 of the operator sleeve. A thrust washer 63 is disposed between the collar and the shoulder. The thrust collar and washer are retained in the operator sleeve by a retaining ring 64. This thrust coupling, then, transfers axial thrust forces from the operator sleeve to the ram body. Rotation of the operator sleeve is effected by an operator handle 65, in the form of an elongated bar extending through transversely aligned holes in the operator sleeve.

To enable tightening of the packing nut 54, of the ram packing gland, the operator sleeve is provided with several axially and rotationally spaced access holes 67. These access holes are disposed generally in the area of the exposed portion of the packing nut 54, when the valve is open, to enable rotation of the packing nut by engaging the indentations 55 with a suitable tool through an access hole.

A safety vent passage is provided in the lower valve body 21 above the valve seat. This consists of a vent passage including an internally threaded bore opening to the exterior wall for receiving a rupture disk and vent fitting 58 for connecting a vent conduit to the valve housing. This fitting 58 is of known configuration, and would include a rupture disk designed to rupture and vent the interior of the valve to flare at a selected pressure.

The rod packing gland 25 is removably attached to the upper end of the ram body 40 by means of a coupling union 70. The union consists of a union body 71 which is threadedly attached to the ram body nipple 41, a union ring 72 and the externally threaded lower flange of the gland body 73. The coupling union 70 constitutes a suitable gas tight seal. The packing gland 25 includes, in addition to the gland body, a lower packing ring 74, an upper packing ring 76, suitable compressible packing material 75 between the packing rings, and a gland cap 77 threadedly coupled to the upper end of the gland body 73. All of the parts of this packing gland assembly, as well as other components of the flow control device, are provided with opposed external flats to enable the placing of suitable wrenches on these parts to effect relative rotation.

The lower packing ring 74 is a split sleeve assembly divided in an axial plane, confined within an internal recess in the ram body nipple 41 at one end, and also confined at its upper end within the gland body 73. This packing ring is provided with an external annular groove to enable removal of the ring from the assembly as will be described subsequently. The upper packing ring 76 is also a split sleeve assembly, divided in an axial plane, and this ring is provided with an upper external conoid which acts with a central conoid opening in the gland cap 77. These coacting conoids function to center the polished rod 18 relative to the gland assembly; and this is important since the upper and lower packing rings also function as guides for the rod. For this reason the packing ring-guides 76 and 74 are preferably fabricated from a suitable bearing metal. The packing material 75 may be the same as the packing material 52 for the ram packing gland.

Figure 7:
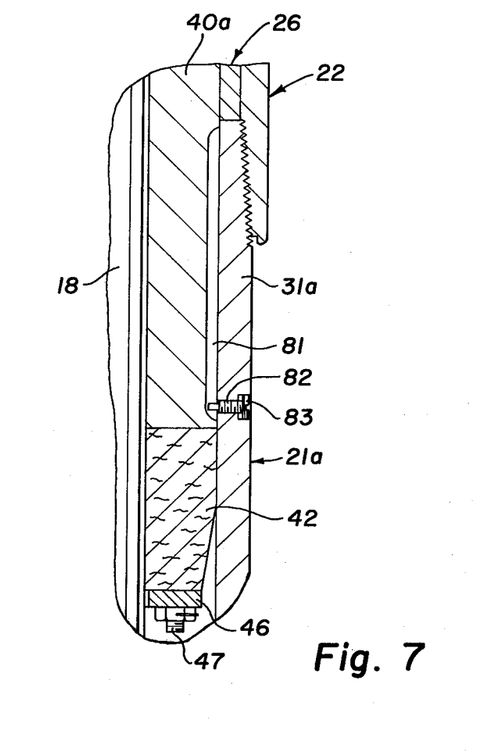
FIG. 7 is a fragmentary view, taken in an axial plane, showing rotation prevention means between the valve body and the ram.

In the ram structure as above described, it is possible that some twisting strain may be placed on the tie rods 47 during the seating and unseating of the valve, should there be some binding of the thrust coupling 60 which urges rotation of the ram 23 relative to the valve body 21, 22. To obviate any damage to the packing plug assembly, it may be desirable to include means to prevent rotation of the ram relative to the valve housing. Such anti-rotation structure is illustrated in FIG. 7 which includes a slightly modified form of lower valve body 21a and ram body 40a. In this form the upper nipple 31a of the lower valve body is substantially longer, to enable substantial axial overlap of that body and the ram body. The ram body 40a is provided with a single longitudinal groove 81, extending from the lower end of the ram body for a length somewhat longer than the operating stroke of the ram. The lower valve body is provided with a threaded recess for accommodating a set screw key 82 having a tip end which extends into the groove 81; and this recess is provided with a larger internally threaded counterbore, for receiving a sealing plug 83 which may function also as a lock nut for the set screw 82. The relative lengths of the valve body nipple 31a and the ram body groove 81 are such that, when the ram is at the upper limit of its stroke, the upper end of the groove will remain below the ram packing gland 26.

Figure 8:
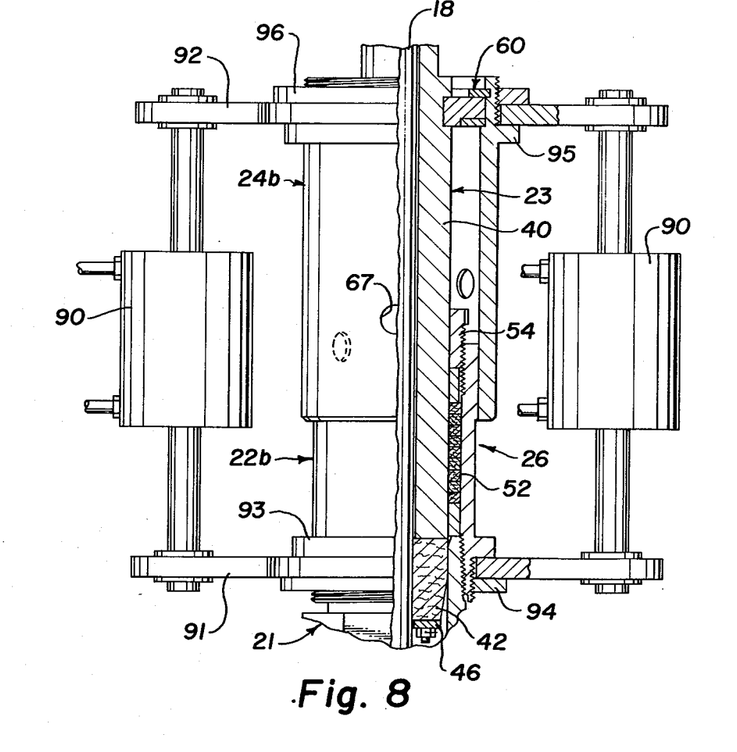
FIG. 8 is a fragmentary elevation view of the device of FIG. 1, showing a modified form of device with hydraulic operators for the ram.

FIG. 8 of the drawing is a fragmentary view of a similar control device according to the invention, illustrating alternative hydraulically actuated means for reciprocating the ram 23 to open and close the valve. In this modified form of device, the identical parts already described are identified by the same reference numbers. The ram 23 is sealed relative to the upper valve body 22b by the packing gland assembly 26. The upper valve body 22b is modified relative to the modified operator sleeve 24b, in that there is no thread coupling between these members. Rather, the operator sleeve is dimensioned for an axially sliding fit relative to the upper valve body. The operator sleeve 24b is coupled to the ram 23 by the same thrust coupling 60; however, a different type of thrust coupling might be used here since there is no requirement for relative rotation of the operator sleeve and ram.

Reciprocation of the ram 23 and its operator sleeve 24b is accomplished by a pair of oppositely disposed, double acting, hydraulic cylinders 90 which are connected between a lower yoke 91 and an upper yoke 92. The lower yoke 91 is seated against the lower face of a flange 93, provided adjacent to the lower end of the upper valve body 22b; and the yoke is secured against this flange by a nut 94. Similarly, the upper yoke 92 seats on the upper face of a flange 95 provided adjacent to the upper end of the operator sleeve 24b; and this upper yoke is secured by a nut 96. The hydraulic cylinders effect downward movement of the yoke 92 to effect the closing of the valve, and upward movement of the yoke 92 to open the valve. With this type of control, the opening and closing of the valve may be accomplished remotely and also, if desired, automatically.

Figure 9:
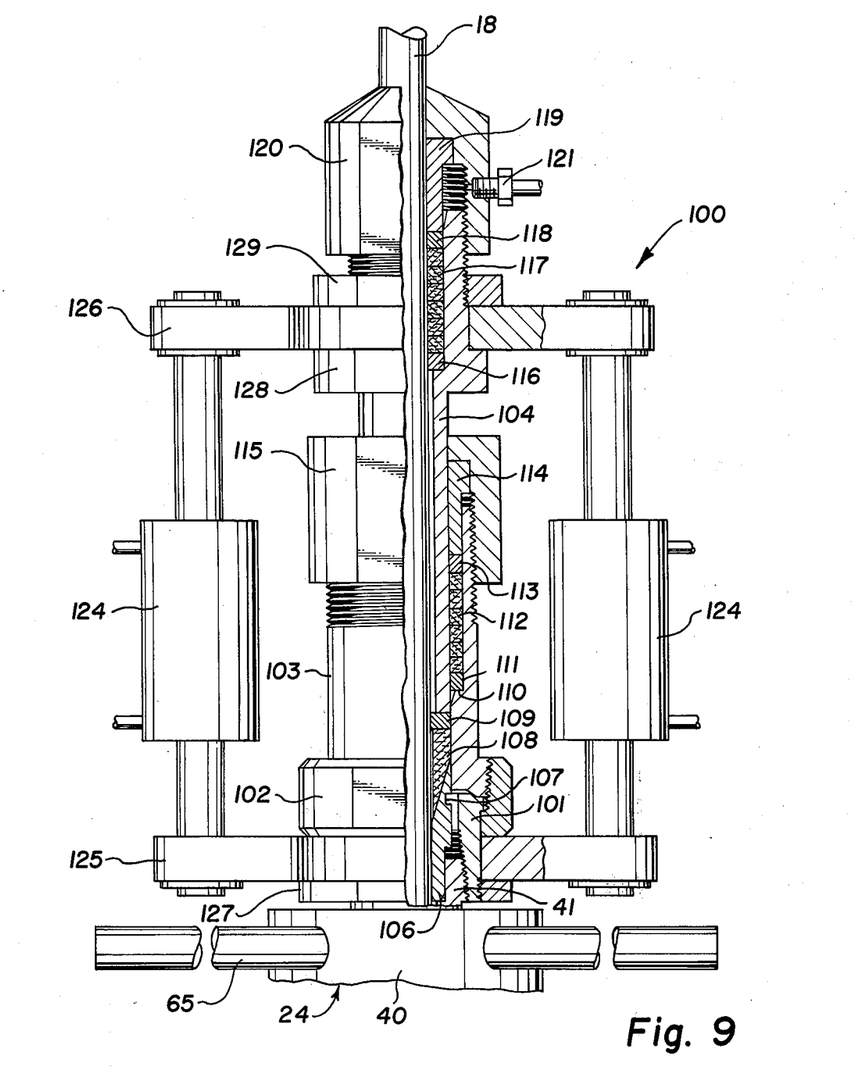
FIG. 9 is a view of a modified form of sucker rod packing gland assembly and related structure for the device of FIGS. 1 or 8.
Figure 10:
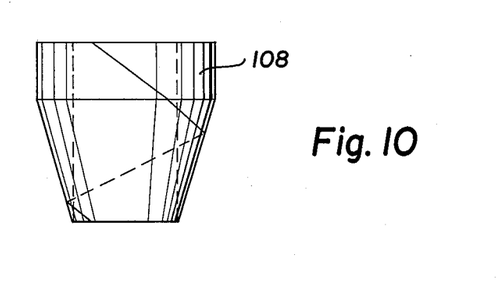
FIG. 10 is a detail view of a packing plug for the gland assembly of FIG. 9.

FIGS. 9 and 10 of the drawing illustrate an alternative form of rod packing assembly for use with the control devices of FIGS. 1 or 8, which includes a packing leak safety shutdown system. FIG. 9 illustrates portions of the upper end of the device illustrated in FIG. 1, including the operator sleeve 24 and associated operator handle 65, and the nipple 41 at the upper end of the ram body 40. The remaining structure illustrated in FIG. 9 is a rod packing and safety shutdown assembly 100. This assembly is secured to the nipple 41 of the ram by means of a union consisting of a union body 101 threaded onto the ram nipple, a union ring 102 and the externally threaded lower flange of a packing gland body 103 for the shutdown mandrel 104. The mandrel 104 is a generally tubular member having a lower reduced diameter portion dimensioned for clearance with the polished rod 18, and having an enlarged upper portion defining a gland body for the rod packing gland.

The mandrel is the operator for the shutdown packing which consists of the following components. A rod guide bushing 106 is an axially split sleeve having its proximal end confined within a recess in the ram nipple 41. This bushing is fabricated from a suitable bearing metal, and functions in part to guide and center the rod relative to the ram 40 and to the packing assembly 100. The distal end of this bushing is provided with an internal, inwardly converging conoid surface defining a packing wedge; and the distal end is received within the lower end of the gland body 103. A packing body 108 is confined between the packing wedge and an upper split packing ring 109, which packing ring is engaged by the lower end of the mandrel 104.

The packing body 108 may be fabricated from the same packing materials previously described, such as metallic wool or felt. FIG. 10 is a detail view of this packing body 108, illustrating the shape which includes an upper cylindrical portion and a lower external conoid which coacts with the conoid surface of the packing wedge. In preferred form the packing body may be fabricated in the form of a one piece spiral, as illustrated in FIG. 10, so that it may be assembled around the polished rod 18. In assembled relation, as seen in FIG. 9, the packing body will not be maintained in engagement with the rod, but is a standby shutdown packing to be employed in the event of a leak in the rod packing to be described. In this event the mandrel 104 will be moved downward to effect radially inward compression of the packing body by coaction with the conoid of the packing wedge. This seating of the body will occur only after reciprocation of the polished rod is stopped.

The mandrel packing gland includes, in addition to the gland body 103, a split lower packing ring 111, gland packing material 112, a split upper packing ring 113, a split pusher sleeve 114 and a packing cap 115 threadedly coupled to the gland body 103. The packing material 112 may be a wrap around packing or other suitable gland packing material.

The rod packing gland consists of the gland body defined by the upper end of the mandrel 104, a lower metallic, split packing ring 116, gland packing material 117, an upper metallic split packing ring 118, and a split guide bushing 119 functioning as a pusher sleeve retained within the upper gland cap 120. The gland cap 120 is threadedly coupled to the upper end of the mandrel 104. This rod packing gland is subject to considerable wear because of reciprocation of the rod; and the packing material and packing rings should be chosen for wear resistance as well as for sealing against the leakage of toxic gases. Suitable material for this packing gland may be a strand of the above described material identified as carbon felt and graphite felt. The guide bushing 119 functions as a centering bushing for centering the rod relative to the packing assembly at the upper end, and is preferably fabricated from a suitable bearing material resistant to corrosive gases and fumes.

The gland cap 120 is provided with a suitable vent passage and sniffer fitting 121 for connecting the upper end of the rod packing to a suitable gas detector for the purpose of warning and/or for automatic control of the safety shutdown mechanism.

The safety shutdown mechanism consists of a pair of oppositely disposed, double acting, hydraulic cylinders 124, connected between lower and upper yokes 125 and 126 mounted respectively on the union body 101 and the mandrel 104. The lower yoke 125 is seated against the lower face of the union ring 102 by a nut 127. The upper yoke 126 is seated against the upper face of a flange 128 of the mandrel by a nut 129. It will be seen then that the double acting hydraulic cylinders 124 function as part of the safety shutdown system. An automatic control may respond to detection of a leak at the sniffer fitting 121 and effect automatic operation of the cylinders to move the upper yoke 126 downward and effect compression of the packing body 108 against the polished rod 18. Such automatic control would effect simultaneous shutdown of the pump and accompanying reciprocation of the polished rod. This enables safety shutdown of the system and prevents any leakage of gas until the rod packing gland can be suitably adjusted or repaired.

A mechanical operator mechanism may be provided for the leak safety shutdown, in lieu of the described hydraulic operator mechanism.

Operation

The operation of the flow control devices will now be described briefly, in relation to service conditions for producing a zone of asphaltic crude, where the formation includes hydrogen sulphide gas and wherein steam flooding techniques are employed to produce the zone. For this operation, the valve is closed during the period of several weeks while superheated steam is injected into the producing zone. The temperature of the formation and of the material in the producing well casing is eventually raised to a temperature that precludes the use of known elastomeric materials as packing material; and the steam produces a very high pressure. Accordingly, those are the operating conditions during this period of operation; and the control device must continue to function under these conditions, functioning particularly to seal the wellhead against leakage of toxic gas.

When a zone is ready to produce, the injection of superheated steam is stopped, the valve is opened, and the well pump is operated through reciprocation of the polished rod 18. The pressure drops drastically, and low pressure may be produced by the well pump. The temperature at the wellhead also reduces drastically when the steam injection is stopped, and may be maintained at a temperature high enough for asphaltic crude oil to behave as a liquid instead of as a solid by auxiliary heating devices.

The opening of the valve, that is the lifting of the ram may be difficult because of the cementing effect of the high viscosity crude extant in the valve seat at the time of closure. The thrust forces necessary to open the valve are available in the design of this invention; and because of the relation of the sealing surfaces of the valve seat and the ram packing plug, the separating forces are essentially in shear, so that limited galling or other deterioration of the packing plug occur, and the packing plug remains usable for more operating cycles of valve operation than is possible with other designs.

At the completion of the pumping period, which may be many days for example, the valve is closed, and a new period of steam flooding may commence. Prior to closing the valve the pumping is stopped. When the valve is closed, by rotation of the operator handle or hydraulically to lower the closure ram 23, the retaining rings 46a and 46b will first engage the shoulder 35 and, with continued movement of the ram body 40, the packing plug 42 will be axially compressed between the retaining rings and the valve body, with resultant lateral or radial expansion of the plug into tight sealing engagement with both the walls of the valve seat and the polished rod 18. This produces an extremely tight seating of the valve. The conoid shape of the seat and plug will enhance this function.

During the pumping portion of the cycle it is the function of the ram packing gland and rod packing gland to seal the device relative to the escape of toxic gases in a manner to meet the safety code requirements. These packing glands must be operative and effective at elevated wellhead temperatures. The packing nut 54 for the ram packing gland may be rotated to compress the packing, when the valve is open, as has been described; and the gland caps 77 and 120 for the rod packing gland may be rotated to compress the packing at any time. The packing for this gland will, of course, wear much faster because of the reciprocation of the polished rod.

The maintenance of the flow control device, particularly the replacement of the several packings and of the packing ring-guides for the packing glands is accomplished readily without removal of the pump polished rod. The rod packing gland will require more frequent replacement of ring-guides and packing material because of the more rapid wear. To disassemble the rod gland 25, the gland cap 77 would first be separated from the gland body and lifted. The upper ring-guide 76 may then be removed; and the gland body 73 may be separated from the ram body at the union 70 allowing the lifting of the gland body and the exposure of the lower guide rings 74. These rings may then be removed through the use of a prying tool. The packing material 75 may be removed from the gland body from either end thereof and, similarly, new packing material may be inserted within the gland body from either end. Reassembly of the new gland is then readily accomplished. Servicing of the packing assembly 100 is readily accomplished in a similar manner.

To replace the packing material and/or packing rings of the ram packing gland 26, it is first necessary to remove the thrust coupling retaining ring 64 and then removal of the thrust coupling assembly 60 to allow for separation of the operator sleeve 24 from the upper valve body 22. The operator sleeve is then removed from the upper valve body 22 and raised. The upper valve body may then be unthreaded from the lower valve body nipple 31, and axially separated. This will allow removal of the upper split packing ring 53 from the upper end of the valve body and the removal of the lower split packing ring 51 from the lower end of the valve body; and the packing material 52 may be removed from either end. The replacement of the split packing rings and packing may then be readily accomplished and the packing gland reassembled. A particular feature of this ram packing gland is that it is immaterial how the coacting threads of the lower valve body nipple and the upper valve body make up, and there is no problem with the location of the gland packing rings and packing material. These gland elements are self-centering, in the sense that the lower packing ring 51 seats on the valve body nipple 31 and, of course, the packing nut 55 effects the desired compression of the packing material.

When it is necessary to replace the packing plug 42a this may also be accomplished without removal of the polished rod 18 and without disturbing the lower valve body 21. It is first necessary to again remove the thrust coupling 60 as above described, and then to separate the upper valve body 22 from the lower valve body nipple 31. It may be desirable first to loosen the packing nut 54 to allow relatively free sliding of the upper valve body relative to the ram body. The assembly of the upper valve body and operator sleeve is then raised and separated from the lower valve body; and the ram 40 is also raised slightly relative to the polished rod, to expose the packing plug assembly. The packing plug halves 42a and 42b are released first by removing the safety wires from the nuts 49, then removing the nuts and the retaining rings halves 46a and 46b. Where the packing plug halves are joined by serrated or interlocking fingers, the assembled plug may be moved downwardly relative to the tie rods 47; and the halves then separated from the rod. The replacement of new packing plug halves, and reassembly of the device is then readily made.

Features and Advantages

An important feature of the invention is the overall construction of the valve including the ram which reciprocates coaxially with the polished rod, and the associated packing plug structure which allows the valve to function through more operating cycles under the extremely adverse conditions of wide temperature range, the pumping of crude having extremely high viscosity under certain of the operating conditions, and the existence of toxic gases. A particular feature is the design of the valve plug which causes the expansion of the compressible plug material into very tight sealing engagement with the walls of the seat and with the rod when the valve is closed, and which enables withdrawal of the plug and opening of the valve with minimum damage to the packing material. An ancillary advantage is the utilization of packing materials having the capability to perform under the indicated adverse and extreme operation conditions.

Another important feature of the wellhead control device is the design of the packing glands for sealing against the escape of toxic gases with respect to the ram and also with respect to the rod. An ancillary feature of the design of these packings is the capability of maintaining or repairing packings readily, with a minimum down time, and particularly without the necessity of removing the polished rod.

Another advantage of the control device is the design of the main closure valve which enables operation either manually by means of an operating handle or hydraulically.

Still another feature and advantage of the invention is the design of the rod packing assembly which includes an adjustable packing gland and a positive shutdown gland to function in the event the packing fails; with the positive shutdown gland being operable hydraulically and automatically if desired in response to leak detection.

While the preferred embodiments of the invention have been illustrated and described, it will be understood by those skilled in the art that changes and modifications may be resorted to without departing from the spirit and scope of the invention.

What is claimed is:

1. In a flow control device for a wellhead which passes a polished rod of a pump sucker rod string
   a valve for controlling the wellhead flow comprising a body providing an axial flow passage and circumambient closure seat, and a coacting closure ram guided for axial reciprocating movement relative to said closure seat; said closure seat and said closure ram being configured for coaxial association with the polished rod;
   said closure ram comprising an elongated body, a compressible packing mounted at the closure end of said body for seating in said closure seat, and retaining means for axially retaining said packing on said body;
   said closure seat comprising a shoulder confronting a peripheral portion of said ram packing;
   and operator means for moving said ram to a first position into sealing engagement with said closure seat wherein said packing is urged into sealing engagement with said polished rod, and to a second position wherein said packing is displaced and unsealed from said closure seat and said polished rod.

2. A device as set forth in claim 1 characterized by
   said retaining means comprising transverse plate means mounted at the closure end of said ram body for axial movement relative thereto, and configured for engagement with a portion of said shoulder when said closure ram is seated on said closure seat.

3. A device as set forth in claim 2
   said retaining means circumambienting the distal end of said packing;
   said closure seat shoulder comprising a circumambient transverse shoulder confronting a portion of said retaining means, and a circumambient tapered shoulder diverging outwardly from said transverse shoulder.

4. A device as set forth in claim 3 characterized by
   said closure seat further comprising a proximal cylindrical wall contiguous to said transverse shoulder and extending toward said ram, said circumambient tapered shoulder comprising a conoid wall diverging outwardly from said proximal cylindrical wall, and a distal cylindrical wall contiguous to the larger end of said conoid wall;
   said ram packing being configured to include a distal cylindrical portion dimensioned to seat within said seat proximal cylindrical wall, a central conoid portion dimensioned to seat within said seat conoid wall, and a proximal cylindrical portion dimensioned to seat within said seat distal cylindrical wall.

5. A device as set forth in claim 1 characterized by
   said closure seat shoulder comprising a tapered wall of said axial flow passage.

6. A device as set forth in claim 5 characterized by
   said closure seat shoulder further comprising a tapered convex wall of said axial flow passage.

7. A device as set forth in claim 5 characterized by
   said closure seat shoulder further comprising a tapered concave wall of said axial flow passage.

8. A device as set forth in claim 5 characterized by said closure seat further comprising a conoid wall defining said tapered wall, and a proximal cylindrical wall contiguous to the smaller end of said conoid wall;

said ram packing being configured to include a conoid portion dimensioned to seat within said seat conoid wall.

9. A device as set forth in claim 8 characterized by said closure seat further comprising a distal cylindrical wall contiguous to the larger end of said conoid wall;

said ram packing being configured further to include a proximal cylindrical portion dimensioned to seat within said distal cylindrical wall.

10. A device as set forth in claim 1 characterized by said compressible annular packing comprising a preshaped packing plug configured for sealing engagement with said closure seat.

11. A device as set forth in claim 1 characterized by said packing comprising coacting segments circumambienting said polished rod.

12. A device as set forth in claim 11 characterized by said packing segments having mutually confronting joint faces provided with coacting interleaving fingers, to define an axial flow seal at said joints.

13. A device as set forth in claim 12 characterized by said interleaving fingers comprising sawtooth fingers having an included angle of about 30°.

14. A device as set forth in claim 1 characterized by said retaining means of said ram comprising plate segments circumambienting said rod and at least one tie rod associated with each segment and disposed parallel to the axis of said ram for limiting the movement of its respective segment axially away from said ram body; said retaining plates confining said compressible packing between said plates and the confronting end of said ram body.

15. A device as set forth in claim 14 characterized by said tie rods comprising all-thread rods threaded into threaded recesses in the end of said ram body; said ram body having transverse threaded bores communicating with said tie rod threaded recesses; set screws threaded into said transverse bores for locking said tie rods to said ram body; and locking nuts threaded onto the distal ends of said tie rods for retaining said retaining plates and said packing.

16. A device as set forth in claim 14 characterized by said plate segments comprising interlocking segments.

17. A device as set forth in claim 14 characterized by said packing having passages therethrough for accommodating said tie rods.

18. A device as set forth in claim 1 characterized by said valve body comprising an externally threaded upper end portion; an internally threaded operator sleeve threadedly mounted on said valve body upper end portion; means on said sleeve for rotating said sleeve relative to said body; and a rotatable thrust coupling mounted between said operator sleeve and said ram body, for transferring axial thrust forces therebetween.

19. A device as set forth in claim 18 characterized by said thrust coupling comprising a split annular thrust collar, and means for axially retaining said thrust collar relative to said ram body and to said operator sleeve.

20. A device as set forth in claim 18 characterized by said valve body and said ram body having coacting means for preventing relative rotation therebetween during relative reciprocation thereof.

21. A device as set forth in claim 1 characterized by said valve body comprising an assembly of a lower body and an upper body; said lower body providing said closure seat, and having an upper externally threaded nipple portion; said upper body comprising a generally cylindrical sleeve having an internally threaded proximal end for coupling to said lower body nipple portion, and having an internally and externally threaded distal end;

a packing gland for said ram body comprising: said upper body, an annular externally threaded packing nut threaded into the distal end of said upper body, and a compressible annular packing disposed between said ram body and said upper valve body and axially between said lower valve body and said nut.

22. A device as set forth in claim 21 characterized by said annular packing consisting of a fibrous metallic material.

23. A device as set forth in claim 21 characterized by a rod packing gland mounted at the upper end of said ram comprising: a gland body threadedly attached to the upper end of said ram; lower and upper rod guide rings confined between said gland body and the polished rod; a compressible packing material disposed between said guide rings; and a gland cap threaded on the distal end of said gland body for compressing axially the assembly of said guide rings and gland packing.

24. A device as set forth in claim 1 characterized by said valve body comprising a sleeve portion at its upper end; an operator sleeve disposed over said valve body sleeve portion for axial movement relative thereto; a thrust coupling mounted between said operator sleeve and said ram body, for transferring axial thrust forces therebetween; and means for reciprocating said operator sleeve relative to said valve body;

a packing gland for said ram body comprising said ram body upper cylindrical portion, and an annular externally threaded packing nut threaded into the distal end of said valve body sleeve portion;

said packing nut having external peripheral indentions for engagement by a driving tool to effect rotation thereof; and said operator sleeve having a plurality of axially spaced access holes for said driving tool.

25. A device as set forth in claim 1 characterized by said valve body comprising a sleeve portion at its upper end; an operator sleeve disposed over said valve body sleeve portion for axial sliding reciprocating movement relative thereto; a thrust coupling mounted between said operator sleeve and said ram body, for transferring axial thrust forces therebetween; and means for reciprocating said operator sleeve relative to said valve body;

said operator means comprising a transverse yoke mounted on said valve body, a transverse yoke mounted on said operator sleeve, and hydraulic cylinder means operatively connected between said first and second named yokes for effecting relative reciprocating movement of said operator sleeve relative to said valve body.

26. A device as set forth in claim 1 characterized by a rod packing gland mounted at the upper end of said ram comprising: a gland body threadedly attached to the upper end of said ram; lower and upper rod guide rings confined between said gland body and the polished rod; a compressible packing material disposed between said guide rings; and a gland cap threaded on the distal end of said gland body for compressing axially the assembly of said guide rings and gland packing.

27. A device as set forth in claim 26 characterized by said guide rings comprising mating sleeve segments fabricated from a bearing material.

28. A device as set forth in claim 26 characterized by said gland body being threadedly attached to said ram by means of a union coupling.

29. A device as set forth in claim 26 characterized by said upper guide ring having an upper external coaxial conoid and said gland cap having a coaxial internal conoid for coaction with said guide ring conoid, for centering said rod packing gland relative to said rod.

30. A device as set forth in claim 29 characterized by a rod shutdown packing gland mounted at the upper end of said ram.

31. A device as set forth in claim 1 characterized by a rod packing gland assembly mounted at the upper end of said ram including:
a shut-down packing gland comprising a first gland body threadedly attached to said ram, a packing ring having a conoid interior face confined within said gland body, an annular compressible packing having a conoid exterior face for coaction with said packing ring conoid, and a sleeve-like mandrel received within said gland body for urging said packing material toward said packing ring to effect compression thereof against said sucker rod;
a mandrel packing gland comprising said first gland body, a compressible packing material disposed between the exterior of said mandrel and the interior of said gland body, and a packing cap threaded onto the upper end of said gland body for compressing said mandrel packing axially;
and a rod packing gland comprising a second gland body defined by the upper end of said mandrel, a compressible packing disposed between said rod and said mandrel, and a gland cap threadedly attached to the upper end of said mandrel for compressing axially said packing material;
and means for reciprocating said mandrel relative to said first gland body.

32. A device as set forth in claim 31 characterized by said first gland body being threadedly attached to said ram by means of a union coupling.

33. A device as set forth in claim 31 characterized by said operator means for said shut-down packing gland comprising a first transverse yoke mounted on said first gland body, a second transverse yoke mounted on said mandrel, and hydraulic cylinder means operatively connected between said yokes for effecting relative reciprocation thereof.

34. In a device for selectively closing an axial flow passage having a reciprocable rod passing therethrough, said passage including an annular closure seat having an internal shoulder means an axially movable closure member comprising
a tubular ram body;
a plurality of tie members extending axially from one face of said body;
transverse retaining plate means mounted on said tie members for axial movement relative to said one body face;
an annular packing for engaging said closure seat, confined between said one body face and said retaining plate means;
said body, said retaining plate means, and said packing comprising members circumambienting said rod;
and said tubular body being movable axially to a first position to engage and seal said packing with said closure seat and thereby urge said packing into sealing engagement with said rod and to a second position out of sealing engagement with said closure seat and said rod.

35. A device as set forth in claim 34 characterized by said tie members comprising elongated tie rods.

36. A device as set forth in claim 34 characterized by said packing comprising a compressible body having passages therethrough for accommodating said tie members.

37. A device as set forth in claim 36 characterized by said packing comprising a pair of coacting segments having mutually confronting joint faces disposed in a generally axial plane.

38. A device as set forth in claim 37 characterized by said joint faces being provided with coacting interlocking fingers to define an axial flow seal at said joints.

39. A device as set forth in claim 34 characterized by said packing being formed into a body; said retaining plate means being engageable with the walls of said flow passage to restrict axial movement and effect axial compression of said packing against said ram body.

40. A device as set forth in claim 34 characterized by said retaining plate means comprising interlocking segments;
each retaining plate segment being mounted on at least one of said tie members.

41. A device as set forth in claim 34 characterized by said tie members comprising rigid tie rods.

* * * * *